2,962,489

POLYMERIZATION OF ETHYLENE

Lawrence Zeldin, Madison, Wis., assignor to Bjorksten Research Laboratories, Inc., Madison, Wis., a corporation of Illinois No Drawing. Filed Feb. 10, 1955, Ser. No. 487,444

5 Claims. (Cl. 260—94.9)

This invention relates to the polymerization of unsaturated hydrocarbons, and more particularly to a process of polymerizing ethylene at low pressure.

Methods of producing polyethylene have been reported to require pressures which are among the highest employed in many commercial processes. High pressure techniques introduce numerous, well-known disadvantages. An often cited factor is the need for specialized equipment and plant construction which results in increased expenditures for the manufacturer as well as the consumer since the product is more costly. The use of high pressure apparatus makes it necessary to take extensive and costly precautionary measures to prevent accidents. Various low pressure techniques, on the other hand, result in the production of polyethylene which is often wax-like or oily and of low molecular weight. These objectionable characteristics have stimulated a search for improved production methods.

These investigations have resulted in a number of low pressure methods being proposed for ethylene polymerization. Some of these are characterized by the use of certain catalysts such as organic solvents in the presence of oxygen supplying compounds, persulfate aqueous emulsion, and the use of alfin catalysts, which are mixtures of sodium alkenyls derived from olefins and sodium alkoxides derived from methyl alkyl carbinols. However, ethylene homopolymers of high molecular weight are not easily obtained under 500 atmospheres of pressure. In addition, these polymers had undesirable qualities. It is believed that the need for an improved procedure for ethylene homopolymerization and copolymerization at low pressures is met by this invention.

The problems caused by high pressures are not as profound in the preparation of polymers of the higher hydrocarbon resins. The presence of alkyl groups which supply electrons to the double bond by means of inductive or hypoconjugative effects, usually enhances the reactivity of the molecule toward acidic catalysts, hence facilitating polymerization. Propylene and isobutylene polymerize readily at moderate pressures in the presence of acidic catalysts. Where inductive or hypoconjugative effects are cancelled out, as for example in 2-butene, ready polymerization does not occur.

Many applications of high polymer hydrocarbons are based upon the following factors: decreased swelling in liquids, increased tensile strength and low heat flexibility. Essentially, these properties are attributes of linear polymers with sparse cross-linking, for example, one cross-link per chain. In general, the process herein designated may be adapted to manufacturing polymers characterized by a basically linear structure.

One object of this invention is to provide a method of producing high polymers from unsaturated hydrocarbons.

Another object is to furnish a process for the homopolymerization and copolymerization of ethylene at near atmospheric pressure.

Another object is to produce a polyethylene with a high molecular weight and small degree of chain branching.

In the following description of a process for ethylene polymerization, which may be modified for general olefin polymerization, the proportions and chemicals mentioned serve only as a mode of illustration and not of limitation: one part of boron trifluoride is added to a gas stream comprising 1000 parts of ethylene and 5 parts diazomethane at near atmospheric pressure. The boron trifluoride decomposes the diazomethane in the gas stream, to produce a triggering composition for initiation of chain transfer reactions involving the ethylene and resulting in a polyethylene. It will be noted that the term, polymerization, as used in this specification encompasses homopolymerization, copolymerization and terpolymerization.

In this process the diazomethane belongs to the class of compounds called the diazoalkanes which is distinct from the group designated "diazo compounds." The latter are aryldiazonium salts and their azo tautomers which possess structures represented thus:

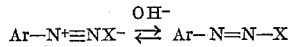

where Ar is an aromatic group and X is any anion. These compounds are stable in the presence of boron trifluoride; the diazonium fluoborates are among the most stable of diazonium salts. Decomposition of these salts results in the synthesis of aromatic fluorides. In direct contrast, diazoalkanes are represented as R—N N: or R=N+=N− or as they were earlier shown,

The diazoalkanes are not salts or azo compounds. Showing little stability toward $BF_3$ and other boron compounds, diazomethane reacts with explosive force to give polymethylene polymers. It is to be stressed that the diazoalkanes are chemically and structurally distinct from the "diazo compounds" often described in patent literature.

The catalytic action of boron trifluoride for the decomposition of diazomethane should not be confused with its use as a catalyst for the synthesis of polyethylene, since the diazoalkanes may be broken down by other boron compounds as well as by copper, anhydrous copper sulfate, cupric stearate, silver powder, iron powder, zinc dust, powdered glass, copper oxide, platinum, sodium and powdered glass. Because of higher reactivity, the boron compounds may be preferred and selected in the following order: (1) boron trifluoride (as a gas or complex with alcohol or water or ether), (2) diborane, (3) methyl borate or other higher borate esters, and (4) borax or boric acid or boric oxide or borosilicate glass. The use of the boron trifluoride can be designated as the most advantageous of the boron compounds because:

[1] It is readily available.

[2] It may be used as a gas or as a liquid complex. In liquid phase, the reaction can be run in water, alcohols or ethers, depending upon which $BF_3$ complex is chosen, or in an inert solvent or diluent. In gas phase, a mixture of $BF_3$ and ethylene is mixed with a mixture of ethylene and diazoalkane in a reaction chamber at the desired temperature and pressure.

[3]. It can be recovered and recycled during the process. Other boron compounds that can be used are: (1) boron halides or subhalides, (2) higher boron hydrides, (3) alkylated boron hydrides such as tetramethyldiborane, (4) boron alkyls, such as boron trimethyl, and boron triethyl, (5) borazole or substituted borazoles (6) substituted boric acids and anhydrides, and (7) salts of boron acids, such as sodium metaborate. Thus a preferred catalyst is a compound characterized by containing boron.

The triggering component furnished by the interaction of diazomethane and a catalyst therefor, not only may initiate homopolymerization, but also copolymerization. Both types of polymerization may occur with suitable monomers, chosen from the following groups: (1) vinyl esters, (2) esters of unsaturated polybasic acids, (3) esters of polymerizable unsaturated acids, (4) monovinyl unsaturated hydrocarbons, (5) esters of acrylic acids and substituted acrylic compounds, and (6) other unsaturated hydrocarbons such as the butenes, propylene, vinyl acetylene, butadiene, isoprene, vinyl halides, nitriles, isocyanates, allyl esters, vinyl silanes, and the like. If the object is to synthesize a relatively linear polyethylene, then diazomethane can be used for good results. As the molecular weight of the diazoalkane increases due to the increased length of the alkyl group, there may be a tendency for greater branching in the polymer chains; with this in mind, diazoethane, diazopropane and diazobutane with a suitable catalyst for their decomposition may also be used to furnish a triggering component for the synthesis of hydrocarbon resins. It may be said that often a monoölefin will polymerize more efficiently with a compound to which it is similar chemically.

Although a ratio of 1 part in 1000 to 1 part in 100 of diazoalkane to ethylene may be used, this range may be increased by concentrations of 1 part in 10 to 1 part in 100,000 inclusive. The quantity of boron halide or boron hydride may extend from 1 part per 10,000 parts of diazoalkane to 10 parts per 1 part of diazoalkane. Generally, the concentration limits for the reactants are as follows: the monomer may be present in amounts as low as 90 mole percent, but preferably in strengths as high as 99 mole percent; the diazoalkane can be effective in the range of from .05 to 10 mole percent, while the boron compound can be operative in concentrations from .005 to 1 mole percent.

The process of this invention may be adapted to either a static system, one in which the ingredients are reacted and subsequently removed and purified or to a flow system, one in which the reagents are continually fed into the reaction zone and the product is continually removed. Schematically, the flow system operates in this manner: after gaseous diazomethane is mixed and pressurized with deoxygenated ethylene and the mixture is permitted to enter a heated, deoxygenated reaction zone, a stream of ethylene mixed with a trace of boron trifluoride or an equivalent is admitted into the same reaction zone; a polyethylene can form and the unreacted gases may be purified and recycled into the $BF_3$-ethylene inlet. For a static design, a stainless steel deoxygenated pressure reactor is charged with diazomethane and pressurized with oxygen-free ethylene; while this composition and a solvent is maintained at a designated temperature, a mixture of ethylene with boron trifluoride or an equivalent is introduced, which results in the formation of a polyethylene and gases which may be recycled after purification. In the latter case, the diazomethane may be prepared in the solvent before the vessel is pressurized with ethylene. The solvent may be a suitable ether, a glycol, an alcohol, a dioxane, tetrahydrofuran, benzene or cyclohexane. Water or methyl alcohol may be used when boron trifluoride is employed. However, methyl alcohol must be added when methyl borate is present in order to prevent hydrolysis of the borate ester. For diborane, a hydroxylic solvent may not be used but an inert solvent or diluent such as an ether or alkane may be used. The versatility of the process is noted by its ready adaption to a static or flow design, thereby suiting a variety of requirements needed for continuous or intermittent polymer production.

Although the boron trifluoride catalyst can be used, the diazomethane is known to decompose upon rapid heating to about 140° C. The decomposition products can induce chain reactions among the ethylene molecules, thereby causing chain growth. In order to insure uniform polymerization, it may be advantageous to maintain a concentration of reactants and a careful control of the temperature. Since the decomposition of pure diazomethane occurs at approximately 140° C., it may not be necessary to apply a higher temperature to initiate chain transfers. This aspect and the small amount of diazomethane which can start the process decrease the cost of producing a superior polyethylene.

The problems involving the representation of the structure of the diazoalkanes are similar to that or the azidoparaffins which are alkyl derivatives of hydrazoic acid. It is believed that these compounds possess a resonance hybrid structure represented as $R-N=N\Rightarrow N$ and $R-N\leftarrow N\equiv N$. As the diazomethane, methyl azide and ethyl azide can be decomposed in the presence of the compounds that initiate diazoalkane decomposition, and in the gas phase, these compounds can be broken down by heating to 200 to 250° C. Thus, by employing methyl azide or ethyl azide with a suitable catalyst for decomposition, the resulting triggering composition may initiate chain transfer reactions involving the ethylene, thereby forming a polyethylene.

The following examples serve as a means of illustration and not of restriction.

*Example 1*

A stainless steel pressure reactor is flushed with oxygen-free nitrogen and charged with 100 parts of deoxygenated water. The nitrogen is removed by evacuation and the reactor charged with 1 part of diazomethane and pressurized with deoxygenated ethylene to 50 atmospheres. The mixture is agitated at 20–30° C. while a mixture of .05 part of boron trifluoride and 200 parts of ethylene are introduced. The agitation is continued as long as a pressure drop is observed. The gases are bled off and purified for recycling. The polyethylene is recovered, washed, pressed and calendered.

*Example 2*

Gaseous diazomethane is generated by adding a solution of potassium hydroxide in 1,4-butanediol to a solution of 4-(N-nitrosomethylamino) isobutyl methyl ketone in 1,4-butanediol in a vacuum. One part of the diazomethane is mixed with 1000 parts of deoxygenated ethylene and fed at 1 atmosphere pressure into a reaction zone maintained at 100° C. A mixture of 0.5 part of boron trifluoride and 1000 parts of deoxygenated ethylene is introduced into the reaction zone. The exit gases may be recycled in the mixture of boron trifluoride and ethylene. The polyethylene is formed in the gas stream and removed by a cyclone type of an arrangement.

*Example 3*

A stainless steel pressure reactor is flushed with oxygen-free nitrogen, and charged with 100 parts of deoxygenated water. The nitrogen is removed by evacuation and the reactor charged with 1 part of diazomethane and pressurized to 25 atmospheres. The mixture is agitated at 110–125° C. while a mixture of .05 part of boron trifluoride and 200 parts of ethylene are introduced. The agitation is continued as long as a pressure drop is observed. The gases are bled and purified for recycling. The polyethylene is recovered, washed, pressed and calendered.

*Example 4*

A gas stream comprising 0.1 mole percent diazomethane is deoxygenated ethylene at 100 atmospheres and 150° C. is mixed with a stream of .01 mole percent of boron trifluoride in ethylene. The polyethylene formed is continuously removed from the reaction tube and the unreacted gases are recycled.

Example 5

A stainless steel pressure reactor is flushed with pure nitrogen, charged with 200 parts of deoxygenated methanol and 20 parts of diazomethane and pressurized with ethylene to 30 atmospheres at 120° C. During this time, the mixture is vigorously agitated. To the reactor is added 1 part of methyl borate. A pressure drop is observed. After 12 hours of agitation at 200° C. the reactor is cooled, the unreacted ethylene is released through a suitable valve and the polyethylene is removed, washed, pressed and calendered.

Example 6

A mixture of 10 mole percent of diazomethane in deoxygenated ethylene is heated in a stainless steel autoclave to 300° C. and 10 atmospheres for 8 hours. After the reactor is cooled and the gases are bled off, the polyethylene may be removed, washed, pressed and calendered. In general, the products of these examples should possess these characteristics: a molecular weight in the ranges of approximately 10,000 to over 76,000, greater tensile strength, higher crystalline melting point, higher heat stability, and a small degree of chain branching.

The diazomethane may be generated from any one of a series of N-methylnitrosoamines. One procedure involves the interaction of a primary aliphatic amine with mesityl oxide to give secondary amines; the secondary amine reacts with nitrous acid to give N-nitroso compounds which may be purified; after purification, they are decomposed with an alcoholic solution of sodium alkoxide to give mesityl oxide and a diazoalkane. The diazomethane may be mixed with the ethylene in a gas stream or generated from a N-methylnitrosoamine solution in an ethylene atmosphere.

Since diazomethane is explosive when impure and/or when heated to about 140° C., the use of the static system is generally preferred for diazomethane is less explosive in solution. Even in the flow system, this property of diazomethane is not objectionable since the low concentration needed and the presence of the ethylene, an inert carrier for diazomethane, may render it safe to use. By deoxygenating the apparatus employed in this process, thru evacuation or flushing with nitrogen, the explosive force of the diazomethane decomposition is reduced. As in many polymerization reactions, a diluent is utilized to dissipate the heat of the reaction and to control the viscosity of the reaction mixture. The deoxygenated water serves this purpose in the static system. It may be said that polymerization and homopolymerization require the application and regulation of similar factors.

The advantages of the invention can best be realized by carrying out the reaction at pressures of from under 1 atmosphere to 50 atmospheres and lower or higher pressure can suitably be used. When the process involves the catalytic decomposition of diazomethane, a suitable temperature range may be —40° C. to 140° C. while the preferred temperature range may be 10° C. to 125° C. If thermal decomposition of diazomethane is employed, a suitable temperature range may be 100° C. to 300° C. while the preferred temperature range may be 140° C. to 220° C. Since pressure and temperature are inversely proportional in relation to the production of a polyethylene with a particular molecular weight, the broad scope of these ranges may be easily adapted to numerous and unique conditions to produce a polyethylene of desired physical properties.

The benefits derived from the comprehensive features of this invention are distributed among the producer, employee, and consumer: lower operating temperatures and pressures result in diminished plant investment and operating expense; a polyethylene of higher crystalline melting point, higher molecular weight, greater tensile strength, higher heat stability, and lesser degree of chain branching can be manufactured. The net result is a superior product synthesized at lower cost.

Having thus disclosed my invention, I claim:

1. A process which comprises polymerizing ethylene in the presence of a triggering composition formed by the interaction of a diazoalkane and a catalyst selected from the group consisting of boron trifluoride, diborane, methyl borate, boric acid, boric oxide, borosilicate glass at a temperature of from —40° C. to 150° C. under a pressure of from 1 to 100 atmospheres.

2. A process which comprises polymerizing ethylene in the presence of a triggering composition formed by the interaction of diazomethane and a catalyst selected from the group consisting of boron trifluoride, diborane, methyl borate, boric acid, boric oxide, borosilicate glass at a temperature of from —40° C. to 150° C. under a pressure of from 1 to 100 atmospheres.

3. A process which comprises polymerizing ethylene in the presence of a triggering composition formed by the interaction of diazoethane and a catalyst selected from the group consisting of boron trifluoride, diborane, methyl borate, boric acid, boric oxide, borosilicate glass at a temperature of from —40° C. to 150° C. under a pressure of from 1 to 100 atmospheres.

4. A process which comprises polymerizing ethylene in the presence of a triggering composition formed by the interaction of diazopropane and a catalyst selected from the group consisting of boron trifluoride, diborane, methyl borate, boric acid, boric oxide, borosilicate glass at a temperature of from —40° C. to 150° C. under a pressure of from 1 to 100 atmospheres.

5. A process which comprises polymerizing ethylene in the presence of a triggering composition formed by the interaction of diazobutane and a catalyst selected from the group consisting of boron trifluoride, diborane, methyl borate, boric acid, boric oxide, borosilicate glass at a temperature of from —40° C. to 150° C. under a pressure of from 1 to 100 atmospheres.

References Cited in the file of this patent

UNITED STATES PATENTS

| | | |
|---|---|---|
| 2,520,338 | Robertson | Aug. 29, 1950 |
| 2,685,575 | Heiligmann et al. | Aug. 3, 1954 |

FOREIGN PATENTS

| | | |
|---|---|---|
| 634,757 | Great Britain | Mar. 29, 1950 |

OTHER REFERENCES

Noller: "Chemistry of Organic Compounds," published by W. B. Saunders Co. (Philadelphia), 1957 (2nd edition), pages 266–268.

UNITED STATES PATENT OFFICE

CERTIFICATION OF CORRECTION

November 29, 1960

Patent No. 2,962,489

Lawrence Zeldin

It is hereby certified that error appears in the above numbered patent requiring correction and that the said Letters Patent should read as corrected below.

Column 4, line 71, for "is" read -- in --.

Signed and sealed this 9th day of May 1961.

(SEAL)
Attest:
ERNEST W. SWIDER
Attesting Officer

DAVID L. LADD
Commissioner of Patents